United States Patent Office 2,696,432
Patented Dec. 7, 1954

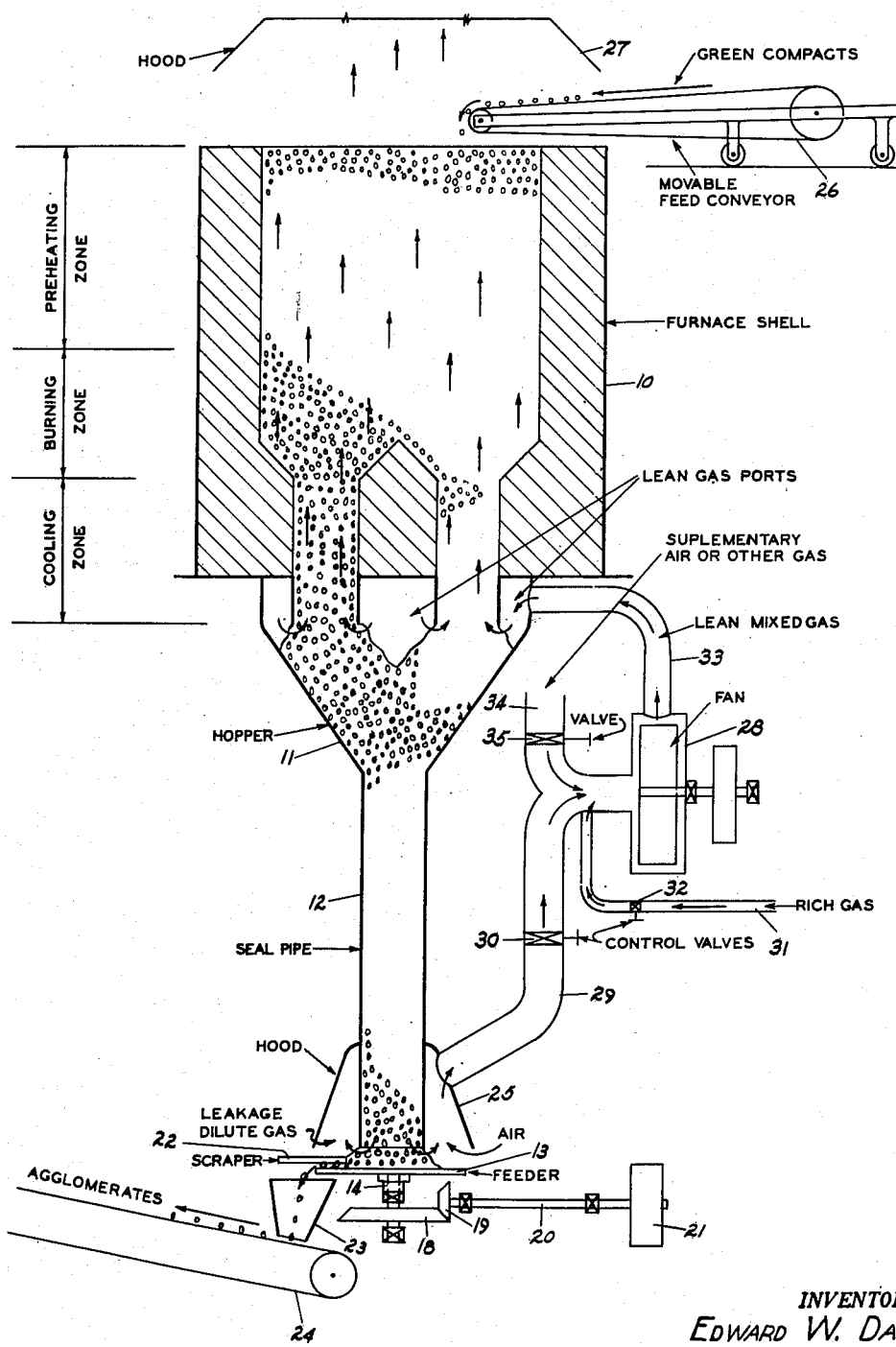

2,696,432

METHOD FOR HEATING SOLIDS

Edward Wilson Davis, Minneapolis, Minn., assignor to Regents of the University of Minnesota, Minneapolis, Minn., a corporation of Minnesota Application December 22, 1950, Serial No. 202,326

9 Claims. (Cl. 75—5)

The present invention relates to a method for the controlled heating of solids and is particularly directed to a method useful for the controlled economical heating of ore concentrates for the purpose of sintering agglomerates of ore into sound and strong yet porous compacts. The invention has as one of its features the combustion of fuel at concentrations outside the range normally required for the propagation of flame, for controlling the production of heat, temperature of, position of heating zone and other factors in the process of heating ore compacts needed.

While the invention broadly involves a method of combustion, it has been found particularly useful for the heating of compacts of fine ores, particularly iron ores, and will be described with special reference to such operation.

Large amounts of iron ore are produced that are too fine for blast furnace smelting, particularly those ores obtained in the process of concentrating low grade ores. It is current practice to agglomerate or otherwise form larger balls or nodules of such ore, and then to harden such agglomerates, balls, or larger shapes by heating. By such heating it is desired to produce adhesion of the particles without undue fusion, but fusion sometimes occurs and this produces certain undesirable chemical compounds and also sometimes results in a glass-like structure that to some degree renders the compact impervious to hot reducing gases. It is desirable to form the compacts of fine iron ore in such a manner that no real fusion takes place leaving the compacts in such form that they are more easily reducible and in which undesirable chemical compounds are not formed. This desirable result, however, is not readily obtainable in known sintering processes and is not obtainable at all in known nodulizing processes, due largely to lack of adequate control of heating.

In order to form compacts of ore particles without fusing, it is necessary to control the temperature accurately to a temperature which is sufficiently high to accomplish the adhesion of the fine particles together but below a temperature at which actual fusion occurs. This temperature for iron ore is ordinarily between 1000° C. and 1300° C., although for some ores the temperatures are outside this range. Ordinarily, the temperature necessary to accomplish the preferable type of sintering is immediately below the fusion temperature, and accordingly it is necessary to raise the temperature of the compacts to near to, but definitely below the fusion point.

In heating solids a known method involves the use of a shaft type furnace, through which the solids move by the force of gravity alone. By forcing the air into the bottom of the shaft the air is preheated in contact with the descending solids, effectively removing the heat retained by them. Further up in the shaft combustible materials are added and burn with the preheated air already in the furnace to secure the desired temperature in the combustion zone. The resultant products of combustion then pass upward, preheating the incoming solids. While this is an efficient operation from the standpoint of fuel consumption, inasmuch as the solids are discharged cold, and the gases that are discharged from the top of the furnace are comparatively cool, this process is subject to the disadvantage that the preheated air coming in contact for the first time with the combustible fuels within the mass of compacts produces very high local temperatures, which temperatures are frequently in excess of the fusion temperature of solids to be heated. Accordingly, some fusion occurs and large masses are sometimes produced which may adhere to the walls of the furnace and obstruct the downward movement of the ore, or these masses may move downward and obstruct the discharge at the bottom of the shaft or the whole mass may be melted as in a blast furnace. It will be apparent, therefore, that this known type of heating process is not entirely satisfactory where fusion is definitely to be avoided.

One method of controlling the temperature such that fusion may be avoided is to burn the fuel in combustion chambers outside of the furnace in which the ore compacts are to be sintered, and to then force the hot products of combustion, at the properly controlled temperature, into the shaft of the furnace. In such a process, however, the combustion chambers that are separate from the ore treating furnace must necessarily be large because of the necessity of preburning the gas completely outside the ore treating furnace. Moreover, these combustion chambers must be operated at a pressure sufficient to force the products of combustion through several feet of rough solids in the furnace. Such pressures can be comparatively high. In a large installation this is not a simple operation and heat loss by radiation and leakage of hot gases from such combustion chambers is considerable. Moreover, to make the operation efficient the heat contained in the ore compacts being treated must be recovered and returned to the combustion chambers by some means.

According to the present invention it is possible to heat treat compacts of ore uniformly at the desired temperature without preburning fuel in combustion chambers and with the recovery of the heat retained by the compacts, all in a furnace of simple design. This process involves the principal described above of burning fuel in contact with incandescent solids without propagation of flame, as set forth herein.

It is an object of the invention to provide a process for the combination of a mixture of fuel and non-combustible material in the presence of an oxygen-containing gas but without propagation of flame.

It is a particular object of the present invention to provide a method for heating compacts of ores involving the combustion of a mixture of ore and fuel and oxygen-containing gas without the propagation of flame, and to control the temperature of the process by the addition of controlled amounts of combustible gas to the oxygen-containing gas, if needed, such additions being in amounts such that the mixture is never capable of exploding or propagating flame.

According to the present invention fine ore compacts may be made in any desired manner by known methods, which, per se, do not form a part of the present invention. Thus, a small amount of finely divided solid fuel is mixed with the ore prior to the formation of the compacts and is uniformly distributed throughout the porous compacts where it burns at the temperatures attained in the process and forms the principal source of available heat supply, thereby reducing and in some instances entirely eliminating the need for added combustible gas or added heat. In the process the solid fuel and any gaseous combustibles burn slowly and evenly without flame propagation and accordingly the agglomerates are uniformly subjected to a controlled temperature slightly but distinctly below that of fusion. Combustible gases, where used, are added and admixed with the oxygen containing gases outside the furnace and in such proportions as to form a mixture incapable of propagating flame and the gas mixture is only then passed through the compacts. For example, fine damp ore and about 1% to 3% of finely divided carbon in the form of carbonaceous fuel, such as coal, brown coal, lignite, anthracite or their chars, or powdered anthracite coal and powdered ore are mixed and the mixture may be extruded through dies, or it may be briquetted or may be molded into balls or other shapes, as for example described in Patent No. 2,411,873. Such shapes, however made, are herein designated "compacts."

About 1% of finely divided carbon is added to the ore when the ore is magnetite and about 2% of finely divided carbon is added to the ore when the ore is hematite. The amount of finely divided combustible material that is added, of course, depends upon the percentage carbon contained in such finely divided combustible material.

If the ore is coarse, the addition of bonding agents, such as fine ore, clay, chemicals or other similar materials may be desirable, or the green compacts may be hardened by pre-drying. The only requirement is that the green compacts shall have sufficient mechanical strength to withstand handling in the subsequent heating process by which they are then hardened. In the process the green compacts are heated to incandescence and then brought in contact with oxygen-containing gas which may contain combustible gases for the supplying of some of the heat. If combustible gases are present, such gases are used in an amount (percentage concentrations) which are outside the range which is normally necessary to propagate flame, and such mixture is only then passed through the heated compacts, and combustion without propagation of flame occurs and adds to the available heat for the process.

The invention utilizes the discovery that available solid fuel admixed with ore can be caused to burn without propagating flame by passing a mixture of oxygen containing gas, which may optionally include combustible gas, through the solids while the solids are at or near the temperature of incandescence. The gaseous combustibles, where used to supply some of the heat and hence to control the temperature attained in the process, are used in concentrations outside the range necessary for flame propagation of such gaseous mixtures, and combustion still obtained and heat produced by carrying out the combustion in contact with the incandescent solids that are to be heated. The naturally present or added solid fuels present in the compacts to be heated and such gaseous combustibles as may be present are burned without propagation of flame and provide the available heat supply for maintaining the reaction continuously. For example, it has been found that it is possible to mix with the air that is used to burn the solid powdered fuel of the compacts a very small percentage of combustible gas, such as methane, and to burn such methane without propagation of flame in the furnace. Thus, 1% to 2% methane is mixed with air outside the furnace and then blown into the furnace where the incandescent solids being heated, are located. Such a mixture of air and methane or other combustible gas will not propagate flame under ordinary conditions but I have discovered that by passing such gaseous mixture in contact with incandescent solids which are to be heated, combustion does occur without propagation of flame, and provides heat. The combustion of such very small percentage of combustible gas thus provides a ready means by which the temperature, position of combustion zone, rate and other factors of the process may be quickly regulated at will, the main source of heat being the solid fuel which is simultaneously burned, likewise without propagation of flame. Such solid fuel provides a constant heat supply which, however, cannot be regulated quickly or easily. However, upon this constant heat supply is superimposed the small, easily variable heat supply afforded by the combustible gas, which therefore provides excellent and ready regulation.

The process is most readily understood by reference to the drawing which is a diagrammatic illustration of a furnace of the invention which is suitable for carrying out the process thereof. The furnace 10 is composed of a furnace shell which may be built of fire brick or other suitable refractory material. The furnace shell contains three zones, a preheating zone, a burning zone and a cooling zone. In the preheating zone the temperature of the green compacts is gradually raised to the temperature of incandescence by heat produced by combustion which proceeds in the process without propagating flame and the heat thereby supplied for the process. This is accomplished as the compacts gradually move downwardly into the burning zone in which the heating of the compacts (sintering) takes place and in which the heat necessary for hardening the compacts is provided by the flameless combustion herein described. After heating such compacts they pass through the cooling zone which, as shown, is of smaller cross section, for example, approximately half the cross sectional area of the remainder of the furnace. In this zone the incoming oxygen-containing gas is preheated by the compacts which are thereby cooled. As previously described, the oxygen containing gas may contain a minor percentage of combustible gases, too little to support normal combustion, or alternatively, so great a percentage of combustibles as not to be able to support normal combustion, or no combustible gases. Combustible gases may be fed into the oxygen-containing gases and mixed therewith outside the furnace and only then is the mixture introduced into the furnace where the ore compacts to be heated are located. Thus, the amount of combustible gases may be varied for purposes of regulation, and to balance the heat requirements as the furnace operation is continued. The amount of such combustible gases is, however, always of such minor proportion as to provide a mixture in which flame will not propagate.

The reduced cross section of the cooling zone is desirable since it has been found that if the gas velocities through the cooling zone are too low the burning zone may tend gradually to drift downward into the cooling zone. Therefore, as a safety measure the cooling zone is preferably decreased in cross sectional area, as compared with the combustion zone, thus increasing the gas velocities in the cooling zone so that drifting of the zone of combustion into the cooling zone is avoided. This safely makes possible wider variations in the rate at which the furnace is driven.

Below the cooling zone there is a discharge hopper 11 which desirably feeds into a seal pipe 12. The lower end of the seal pipe discharges onto a feeder disk 13 which is mounted upon shaft 14 suitably driven by gears 18 and 19, shaft 20 and pulley 21. As the feeder disk 13 rotates, the finished and cooled compacts are scraped off by means of scraper 22 and discharge into hopper 23 from which they drop onto conveyor 24 and are removed to storage. A hood 25 is provided to surround the lower portion of the seal pipe for the purpose of catching any leakage gas discharged with the finished compacts. A suitable conveyor 26 is provided for feeding the green compacts into the top of the furnace and the hood 27 is provided for removing products of combustion via an exhaust fan or stack, not illustrated.

The means for supplying the furnace with oxygen-containing gas and combustible gas (where used) is as follows: Fan 28 draws incoming air through conduit 34 which is controlled by valve 35 and where fuel gas is used, such fuel gas is drawn through conduit 31 controlled by valve 32. Recirculated gas from the furnace with some air admixed is drawn through conduit 29 which is controlled by valve 30. The air and such combustible gases as may be used are thus thoroughly and completely mixed outside the furnace and the proportions of air or other oxygen containing gas and combustible gas may be regulated at will within the limits herein defined, by adjusting valves 30, 32 and 35 and only then does the mixture enter fan 28 which thoroughly mixes all of the gaseous components and forces the mixture through conduit 33 into the top portion of the hopper 11. This hopper acts as a manifold for the furnace and the mixture of air for combustion of the solids and such combustible gases as may be present passes upwardly through all sections of the cooling zone where the mixture of gases is preheated and thence upwardly through the burning zone, where combustion of not only the solid fuels in the compacts but also any gaseous combustibles (where used) takes place without propagation of flame, and the products of combustion then pass upwards through the preheating zone where the downflow of green compacts are preheated by the upward (countercurrent) flow of hot gases and thence to the hood 27 where the spent and cooled gases are exhausted.

The operation of the process is as follows: To start the furnace, previously made compacts (of ore and finely divided solid fuel) or crushed rock of about 1 inch size are put into the furnace up to about half way to the top of the cooling zone. According to one method of starting, a charge of incandescent agglomerates or rock, heated by some external apparatus, is then dumped in, so as to bring the level up to about the middle of the preheating zone and to supply starting heat, and the furnace is then filled to the top with green compacts or more crushed rock. The fan is then started and air, together with, optionally, a non-flame propagating percentage of combustible gases mixed therewith leaving the fan is fed through pipe 33 into the furnace. The oxygen available in the gaseous constituents causes combustion to take place, which burns the finely divided solid fuel constituents present or added to the ore, but without propagating flame, thereby producing heat. While this heat supply is frequently sufficient for the operation, some added heat may, as previously indicated herein, be obtained by introducing into the air stream a little combustible gas by opening valve 32, thereby to regulate the heat input. Thus, by adjusting the various controls 30, 32 and 35 one can obtain a lean gas mixture well below the explosive or flame propagating range to add to the heat supplied by the combustion of the solid fuel constituents, all without flame propagation, and thus regulate the temperature and other factors of the process. If natural gas and air only are mixed, this lean gas mixture ordinarily contains gas sufficient to provide about 10 to 25 B. t. u. per cubic foot of the mixture. Thus, natural gas having a heat value of 1000 B. t. u. per cubic foot may be used in an amount ranging from about 1% to 3% of the air added thereto, thus furnishing from 10 B. t. u. to 30 B. t. u. per cubic foot of the mixture. Where methane is used as the fuel, a concentration of up to about 2% or 20 B. t. u. per cubic foot is suitable for the purposes of the invention. At the illustrated concentrations the gas mixture is non-explosive and non-flame propagating even at comparatively high temperatures. Yet the air-gas mixture enters the lean gas ports of manifold 11, as shown in the drawing and from them passes into the interstitial spaces between particles of ore or agglomerates, where combustion of the individual separated molecules of combustibles occurs without flame propagation and this furnishes adequate heat for the process. Most of this gas passes upward. A small amount of leakage downward through tube 12 occurs during operation and such gases as thus escape are collected under the hood 25 where, with indrawn air, they are returned to the fan.

The major part of the gas mixture enters the bottom of cooling zone tubes and in passing upwardly therethrough is heated by the descending compacts and cools them. The heated gases then enter the burning zone and combustion without flame propagation occurs in contact with the incaindescent compacts therein. The finely divided solid fuel particles distributed throughout the compacts individually ignite and burn but, being separated from each other, the particles give up their heat to the surrounding ore particles and no flame propagation occurs. The molecules of combustible gases, where used, likewise ignite when brought into contact with the incandescent solids, but such combustible gases are so diluted that flame does not propagate through the gaseous mixture within the interstices of the compact-filled furnace. Hence, the entire mode of combustion, both of the solids (and gases, where used) is without flame propagation. The products of such combustion serve to heat the ore compacts and maintain them in incandescence, and then pass upwardly, preheating the downwardly moving flow of green compacts. If, during continued operation, the burning zone tends to shift upwardly or downwardly, this can be corrected by adjusting the rate of feed of the green compacts at the top of the furnace (with related adjustment of) the rate of discharge of the finished compacts at the bottom of the furnace or a wide degree of control can also be achieved by varying the amount of combustible gaseous fuel admixed with the air. In this way a suitable rate of heat production can be achieved so as to maintain the burning zone at the desired elevation as indicated.

The temperature so produced in the burning zone is most readily controlled principally by controlling the concentration of combustible gases in the non-flame propagating mixture of air and combustible gas that is fed into the furnace, although speed of feed of the compacts is also an important control. In adjusting the concentration of combustible gas added to the air and in determining the percentage of finely divided carbon being used in any particular run, it is necessary to take into account the nature of the material being burned, the heat input necessary, the amount of naturally occurring combustibles in the material being burned, etc. For example, when burning magnetite, the finished compacts (discharged from the furnace) are converted to hematite by the action of the furnace. This change, in itself, liberates considerable heat in the burning zone and therefore, for example, a non-flame propagating and normally incombustible mixture; methane concentration of up to about 2% in the air is introduced into the furnace, and with the approximately 1% of finely divided carbon in the compacts produces the desired added heat input with resultant temperatures of about 1100° C. in the burning zone. With other ore starting materials the concentration of gaseous combustibles in the non-flame producing and normally combustible mixture may be higher or lower, depending upon the particular material and whether or not other reactions are involved, and the percentage of solid fuel may always be raised safely so as to permit the gaseous fuel to be held to the range of 0% to 3%.

Excellent results have been obtained in burning compacts of magnetite and finely divided coal in a furnace having about seven square feet cross sectional area at the top and having a cooling zone about three feet in height and having a combined height of burning and preheating zone of about six feet. This height may be adjusted so that the exit gases are at a temperature that will carry away all moisture from the furnace. The stack of green compacts flowing down through the preheating zone should not be so great as to permit moisture (of the products of combustion) to condense out as moisture on the compacts as this may cause softening. The length and diameter of the seal pipe at the bottom of the furnace determines the amount of downward leakage of lean gas. For example, it has been found that if this seal pipe is the same length as the distance from the bottom of the cooling zone to the top of the preheating zone and is about 1/20 of the average cross sectional area of the furnace, only about 5% of the gaseous mixture blown into the furnace via tube 33 will pass downward through tube 12 and thence be drawn back into the fan. If desired, a conventional double bell trap or valve system may be used in place of this seal pipe 12.

It has been found that for satisfactory treatment of most iron ore compacts by the use of the instant process, the total heat required is about 800,000 B. t. u. per ton for hematite and that about 25,000 cubic feet of air are required to cool the compacts in the cooling zone and to provide oxygen necessary for combustion of the combustible constituents farther up in the combustion zone of the process. By way of comparison, prior sintering and prior nodulizing processes require between two and three million B. t. u. per ton and about 300,000 cubic feet of air for cooling. The 800,000 B. t. u. per ton figure is approximately the amount of fuel needed if the ore being handled by the instant process is hematite, but with other ores the amount of heat required may be more or less because at the temperature required for hardening the compacts which is usually around 1000° C., certain heat-consuming and heat-producing actions sometimes occur. For example, if the ore is magnetite, this material is largely oxidized to hematitie in the furnace, and since this is a heat-producing reaction less heat input from fuel sources is required. In the oxidation of a ton of magnetite to hematite, about 300,000 B. t. u. of heat are liberated, thus reducing the heat input to about 500,000 B. t. u. If the ore being treated by the instant process contains both magnetite and sulphur, both of which are heat-producing when oxidized, the heat input required may be still further reduced. In fact, some materials have been encountered that contain so much heat-producing material that they cause fusion in this process (after the process is started) even when no heat input in the form of solid or gaseous fuel is allowed. With material of this type, it is necessary to mix the ore with hematite, or other materials that produce no heat, or even absorb heat (such as limestone) in order to prevent fusion. Some ores contain graphite and some blast furnace dust contains carbon, both of which oxidize in the furnace and produce heat. For purposes of calculation it is, therefore, only necessary to add the B. t. u. from the heat-consuming reactions to about 800,000 B. t. u. or slightly less, as explained below, and subtract therefrom the B. t. u. in the heat-producing reactions in order to determine the heat input required. The only requirement for this process is that the amount of heat so added must not raise the concentration of the combustibles in the air-gas mixture entering the furnace to above the flame propagating (explosive) limit, and this can always be accomplished by supplying a substantial even major, portion of the heat by means of the powdered solid fuel which is mixed with the ore, all as aforesaid.

Thus, in accordance with this invention, regulation of the heat input may be achieved on a continuous basis, without danger of explosion (flame propagation) by adding some or most of the fuel used in the process in the form of finely divided carbon which, as previously described, is mixed into the green pellets before they are compacted. The fuel so added provides nearly all of the heat needed for the process and reduces and in some instances even eliminates any steady addition of combustible gases in the mixture of air and gases entering the furnace. When substantially all of the heat input fuel is thus supplied in the form of powdered fuel mixed with the ore in the compacts, slight addition of gaseous fuel to the incoming air is used for precise temperature control, for starting, for shifting the heat zone of the furnace, for forcing or other regulatory purposes, the amount of gaseous fuel introduced being varied by the operator as needed for such regulation. It has been found possible to reduce the gas concentration considerably by thus utilizing the solid fuel as the primary heat source. Thus, when running compacts of fine magnetite, for example, if about 1½% of pulverized anthracite coal is added when they are used in making the green compacts, practically no combustible gas is required for supplying the average heat required in the run and air alone or containing combustible gas in only regulatory amounts is blown into the bottom of the furnace via pipe 33. In this case, the oxidation of the magnetite produces about 300,000 B. t. u. and the oxidation of the anthracite about 400,000 B. t. u., or a total of 700,000 B. t. u. This is somewhat less than the 800,000 B. t. u. referred to above as being required for satisfactory agglomeration, the reason being apparently that the heat-producing reactions on the inside of the pellets (burning of the separated particles of carbon) are more effective than when the heat is supplied by combustible gas which, at first, raises the temperature of the outside of the pellets only. A very slight input of combustible gas via pipe 31 is preferred for control purposes, the amount being varied from time to time as the run progresses, by varying the setting of valve 32, so as to raise or lower the combustion zone in the furnace or raise or lower the temperature attained in such combustion zone or for changing the rate of operation of the furnace, etc. In all events, however, the percentage of added combustible gas is below the normal levels required for flame propagation or combustion, yet such added combustible gas does burn within the furnace and adds to the available heat supply, thus making it possible for the operator safely to control the operation in which the principal heat source is still the solid fuel constituents of the compacts.

Heat-producing solid fuels added during the formation of the green pellets must be very fine and thoroughly mixed with the ore, thus reducing the possibility of flame propagation and fusion. In this way some or most of the fuel supply is added in solid form to the material being treated.

In general, when using a solid fuel the ore may be mixed with sufficient fuel so as to supply 1–3% carbon. The fuel may be in the form of coal, brown coal or lignite or their chars, but preferably in the form of anthracite coal always in a finely divided condition. The mixture may be formed into compacts in any of the above described ways. The compacts are then placed into the furnace which is operated as above described.

The operation may be further exemplified as follows: The ore employed was a magnetite concentrate assaying 64% iron, 50% of which was finer than 325 mesh. The ore was mixed with 1½% of finely pulverized anthracite and the mixture was molded into balls, as described in Patent No. 2,411,873. The compacts thus formed were placed in the furnace described and operated with combustible gas input of less than 2% and the temperature in the combustion in the heating zone was maintained at from 1100° C. to 1200° C. without flame propagation. There was little or no apparent fusion.

In another operation using magnetite, as little as ¾% coal was sufficient and no steady addition of combustible gas was used after the operation was started. It should be pointed out that in treating magnetite, the material is converted to hematite, thus liberating a considerable amount of heat. In some instances the material may naturally contain other sources of heat, as for example sulphur bearing ores, and therefore may require little or no added fuel. Where no heat is supplied by the ore itself, a larger amount of heat from added gaseous or solid fuel may be needed. For iron ore somewhat less than a million B. t. u. total are required, in general, for each ton of ore. The higher the percentage of iron in the form of magnetite that the ore contains, the less fuel will have to be added. With a very high grade magnetic concentrate, less fuel is required than for a lower grade of magnetite concentrate. Also, as has been pointed out, if the ore contains sulphur, the combustion of the sulphur provides heat and less coal is needed.

Other variations are also possible in the process. In place of using atmospheric air as the oxidizing gas, it is possible to use other oxygen containing gases of any desired composition. In some instances, as for example in the treatment of magnetite, it is desirable to use a gas of higher oxygen content than normal atmosphere. Thus, for example, where fine coal is added to the ore in forming the green pellets, it has been found that the highest temperature zone is so near the top of the furnace that heat losses tend to increase. If it is attempted to drive the furnace faster in order to force the highest temperature zone down further in the furnace, the high temperature zone may be broadened considerably. This is believed to be due to the fact that the conversion of magnetite to hematite requires a period of time and that this conversion does not take place until the ore has progressed a considerable distance down in the furnace when the furnace is driven at a rather rapid output rate. By employing an oxygen enriched gas for oxidation it is possible to speed up the rate of conversion of magnetite to hematite and thus confine the highest temperature to a rather narrow zone. This is found desirable since the best operation is obtained when the high temperature can be confined to a small zone. Where the high temperature zone is broadened it is frequently found that the maximum temperature obtained is below that at which satisfactory hardening of the compacts occurs.

In the present invention it also is possible to adjust the composition of the ore to make it more suitable for smelting. Thus, some ores may be deficient in lime, alumina or silica. Such ores may have their composition adjusted so as to make them suitable for reduction in a blast furnace without the addition of the usual materials needed for slag formation. In the addition of some of these slag forming materials it has been found that some of them involve chemical reactions which consume heat. For example, calcium may be added in the form of calcium carbonate which, during the agglomeration operation, is converted to calcium oxide, an operation requiring heat. These various additional reactions which may take place in the process must be taken into account when the amount of fuel supplied is determined so that sufficient fuel, either gaseous or solid, is supplied to enable these reactions to take place and at the same time to permit the temperature to rise. In every instance, however, the gaseous fuel is used in concentrations below (or above) those at which flame propagation will occur.

While the invention has been described with particular reference to the heat hardening of compacts of ores, particularly iron ores, it should be understood that the method may be used for heating many kinds of solids and for other different purposes. It should be understood that for the treatment of different materials various temperatures may be employed. In the production of iron ore agglomerates it has been found that temperatures of around 1100° C. to 1200° C. have been satisfactory. For other ores this temperature will vary but nevertheless the present invention makes possible a means of controlling whatever temperature is desired. The present invention is likewise not limited to the treatment of ores but may be used for other purposes such as for drying or for the removal of chemically combined water, carbon dioxide, sulphur, etc. for roasting at temperatures above red heat and for magnetic roasting. It is to be understood therefore that the invention is not limited to any of the specific embodiments described but may be varied within the scope of the appended claims.

This application is a continuation-in-part of my application Serial No. 750,136 filed May 23, 1947, now abandoned.

What I claim is:

1. The process of producing iron ore agglomerates which comprises forming green compacts of finely divided iron ore and finely divided solid carbonaceous fuel, the solid carbonaceous fuel being substantially uniformly dispersed throughout the compacts and employed in a concentration providing from 1 to 3 per cent of carbon by weight, passing said compacts as a continuous flow downwardly in sequence through a preheating zone, a burning zone maintained at a temperature of incandescence but below that of fusion of the compacts, and a cooling zone, passing a mixture of gaseous hydrocarbon fuel and air as a continuous countercurrent flow into said cooling zone and through the flow of compacts in said cooling zone, the gaseous hydrocarbon fuel being adjusted in respect to the air so as to be below the explosive limit, preheating said mixture of gases in said cooling zone, passing the preheated mixture of gases into said burning zone and over said incandescent solids thus effecting flameless combustion of the gaseous mixture and the solid carbonaceous fuel in said burning zone, the total heat produced in said burning zone by the solid carbonaceous and gaseous fuels and that resulting from oxidation of said ore being less than about 800,000 B. t. u. per ton of said ore, and thereafter passing the products of combustion from said burning zone to said preheating zone to effect drying and preheating of the green compacts.

2. The process of producing hardened compacts of iron ore which comprises forming compacts of a finely divided iron ore and finely divided carbonaceous fuel, the solid carbonaceous fuel being substantially uniformly distributed throughout the compacts and employed in a concentration providing from 1% to 3% by weight of carbon, based upon the amount of ore, passing said compacts as a continuous flow downwardly in sequence through a preheating zone, a burning zone maintained at a temperature of incandescence but below that of fusion of the compacts, and a cooling zone, passing a mixture of air containing less than 3% of a combustible hydrocarbon gas, which mixture is below the explosive limit, into said cooling zone and over said compacts therein, and in a countercurrent direction to cool the compacts of the cooling zone and preheat said mixture, thence passing the preheated mixture countercurrently into said burning zone and over said incandescent solids, thus effecting flameless combustion of the solid fuel in said compacts in the burning zone, the total heat produced in said burning zone by the solid carbonaceous fuel component of the compacts, the hydrocarbon gas and that resulting from oxidation of said ore, being less than about 800,000 B. t. u. per ton of said ore, and thereafter passing the products of combustion countercurrently from said burning zone through said preheating zone to effect drying and preheating of the compacts and thence discharging the thus cooled countercurrent flow of gases.

3. The process of producing hardened compacts of iron ore which comprises forming green compacts of a mixture of finely divided iron ore and finely divided solid carbonaceous fuel, the solid carbonaceous fuel being substantially uniformly distributed throughout the compacts and employed in a concentration providing from 1% to 3% by weight of carbon, based upon the amount of ore used, passing said compacts as a continuous flow downwardly in sequence through a preheating zone, a burning zone which is maintained at a temperature of incandescence but below that at which fusion of the compacts occurs, and through a cooling zone and thereafter discharging the finished compacts, passing a flow of gases composed primarily of air countercurrently through said flow of compacts, said flow being introduced into the flow of compacts adjacent the cooling zone and passed countercurrently thru the flow of compacts for cooling the compacts and preheating the flow of gases, the thus preheated gases being passed thence countercurrently into said burning zone, where the oxygen component of the preheated gases maintains flameless combustion of the solid carbonaceous fuel component of the compacts for substantially maintaining a sintering temperature in said burning zone, thence passing the products of combustion countercurrently through the flow of green compacts for preheating said compacts and recovering the heat available in the flow of gases, and thence discharging the gases, the process being further characterized in that there is introduced into the counterflow of gases composed primarily of air a small percentage of combustible hydrocarbon gas in a regulated amount less than 3%, said percentage of combustible gas being below the explosive limit but sufficient to provide slight additional heat input by flameless combustion in the heating zone for maintaining a temperature of slightly below fusion temperature in said heating zone.

4. The process of producing hardened compacts of iron ore which comprises forming green compacts of a mixture of finely divided iron ores and finely divided solid carbonaceous fuel, the solid carbonaceous fuel being substantially uniformly distributed throughout the compacts and employed in a concentration providing from 1% to 3% by weight of carbon, base upon the amount of ore used, passing said compacts as a continuous flow in sequence through a preheating zone, a burning zone which is maintained at a temperature of incandescence but below that at which fusion of the compacts occurs, and through a cooling zone and thereafter discharging the finished compacts, passing a countercurrent flow of gases composed principally of air through said flow of compacts, said flow of gases being introduced into the flow of compacts adjacent the cooling zone and passed countercurrently therethrough for cooling the compacts and preheating the gases, the thus preheated gases being passed thence countercurrently into said burning zone, where the oxygen component of the preheated gases maintains flameless combustion of the solid carbonaceous fuel component of the compacts for maintaining the condition of incandescence in said burning zone, thence passing the products of combustion countercurrently through the flow of green compacts for preheating said compacts and recovering the heat available in the gases, and thence discharging the gases, the process being further characterized in that the counterflow of gases composed principally of air includes a regulated small amount less than 3% of combustible hydrocarbon gas, said percentages of combustible gas being introduced into the air containing flow and intermixed therewith prior to the introduction of said flow into said green compacts, the amount of such combustible gases introduced into the air containing flow being below the explosive limit and varied in accordance with the temperature of the heating zone for maintaining the temperature of said zone just below fusion temperature of said compacts for adjusting the position of the burning zone, and the like regulatory factors, from time to time during the continuance of said process, the combustion of said gases in said burning zone being flameless.

5. Process of producing strong compacts of iron ore which comprises forming green compacts of finely divided magnetic iron ore and from about ¾% to not substantially more than 3% by weight of finely divided anthracite coal substantially uniformly distributed throughout the compacts, continuously advancing the green compacts to a preheating zone, subjecting the compacts in said zone to products of combustion at an elevated temperature, preheating and drying said compacts, advancing the preheated compacts to a burning zone maintained at a temperature of incandescence, below that of fusion of the compacts, contacting the incandescent compacts with an oxygen-containing gas to effect flameless combustion of the heat producing constituents and to effect hardening of the compacts, advancing the incandescent compacts to a cooling zone, preheating the oxygen-containing gas in said cooling zone to cool the incandescent compacts and to preheat the oxygen-containing gas.

6. Process of producing strong ore compacts which comprises forming green compacts from finely divided ore and finely divided solid carbonaceous fuel, the solid fuel being substantially uniformly distributed throughout the compacts employed in a concentration to provide from about ¾% to not substantially greater than about 3% by weight of carbon, drying said green compacts by means of gaseous products of combustion, continuously advancing the preheated green compacts into an incandescent combustion zone maintained at a temperature below that of fusion of the compacts, introducing into said combustion zone a preheated oxygen-containing gas, flamelessly burning the carbonaceous fuel in the incandescent zone to heat the compacts to incandescence without substantial fusion and advancing the incandescent compacts to a cooling stage and removing heat from the compacts in the cooling stage by means of a countercurrent flow therethrough of said oxygen-containing gas.

7. A process of producing strong ore compacts which comprises: forming green compacts from finely divided ore and finely divided solid carbonaceous fuel, the solid fuel being substantially uniformly distributed throughout said compacts and employed in a concentration to provide not substantially greater than 3% by weight of carbon, drying and preheating the green compacts by passing them as a continuous flow downwardly through a zone heated by means of an upwardly rising gaseous product of combustion, continuously advancing the preheated green compacts into an incandescent combustion zone maintained at a temperature below that of fusion of the compacts, and discharging the compacts out through a cooling zone; preheating a mixture of gaseous hydrocarbon fuel and air by passing it as a continuous countercurrent flow into said compact cooling zone and through the flow of compacts in said cooling zone, said gaseous fuel being present in the air in a regulated concentration less than about 3% such that the mixture of gases has a B. t. u. content not substantially in excess of 25 B. t. u. per cubic foot, the gaseous fuel being present in the air in an amount below the explosive limit, passing the preheated mixture of gases into said combustion zone and over the incandescent solids therein thus effecting the flameless combustion of the gaseous mixture and the solid carbonaceous fuel in said combustion zone, the solid and gaseous fuels being present in relative proportions such that the total heat produced in said burning zone by the solid carbonaceous and gaseous fuel and that resulting from oxidation of said ore is in the range from about 700,000 to 800,000 B. t. u. per ton of said ore, and thereafter passing the products of combustion from said combustion zone to said compact preheating zone to effect drying and preheating of the green compacts.

8. Process of producing strong compacts of iron ore which comprises forming green compacts of a mixture of finely divided iron ore and 1% to 3% finely divided solid carbonaceous fuel substantially uniformly distributed throughout the compacts, passing said compacts as a continuous flow in sequence through a preheating zone, a burning zone maintained at a temperature just below fusion temperature of said compacts and a cooling zone, contacting said compacts in said cooling zone with a countercurrent flow of a preformed mixture of air and combustible hydrocarbon gas, said combustible gas being present in the air in a regulated concentration of less than about 3% such that the mixture of gases is below the explosive limit and has a B. t. u. content not substantially in excess of 25 B. t. u. per cubic foot, preheating said mixture of gases in said cooling zone, advancing the preheated mixture of gases countercurrently through said cooling zone to said burning zone there to effect contact with the heated compacts therein for effecting flameless combustion of the solid fuel in the compacts and of the gaseous fuel in the mixture, advancing the products of combustion countercurrently from said burning zone to said preheating zone to effect drying and preheating of the green compacts and simultaneous recovery of heat from the gaseous products of combustion and then discharging said products of combustion, said compacts being meanwhile discharged from said cooling zone.

9. Process of producing strong compacts of iron ore which comprises forming green compacts of a mixture of finely divided iron and finely ground solid carbonaceous fuel substantially uniformly distributed throughout the compacts in an amount to provide about 1% to 3% by weight of carbon, advancing said compacts as a continuous flow in sequence through a preheating zone, a burning zone in which there is maintained a temperature just below that at which fusion of the compacts occurs, and thence through a cooling zone, said process being characterized by contacting the compacts in the cooling zone with a gaseous mixture of oxygen containing gas and a minor percentage less than 3% of a combustible hydrocarbon gas, said combustible gas being present in a concentration below the explosive limit, said oxygen containing gas and combustible gas being mixed outside the preheating, burning and cooling zones, preheating said mixture of gases by passing said gases in countercurrent flow through the compacts in said cooling zone and continuing said countercurrent flow of the thus preheated mixture by advancing said preheated mixture of gases into the burning zone, flamelessly burning said carbonaceous fuel and combustible gases in said mixture of gases in contact with the incandescent compacts therein for maintaining the temperature of said zone and advancing the products of combustion countercurrently to and through the preheating zone to cool the products of combustion by transferring the heat therein contained to the green compacts in said preheating zone, and regulating the amount of combustible gas so as to maintain the temperature of said burning zone just below the temperature at which fusion of the compacts occurs.

References Cited in the file of this patent

UNITED STATES PATENTS

| Number | Name | Date |
|---|---|---|
| 1,196,705 | Kroll | Aug. 29, 1916 |
| 1,531,695 | Eustis | Mar. 31, 1925 |
| 1,865,554 | Bradley | July 5, 1932 |
| 2,143,905 | Ahlmann | Jan. 17, 1939 |

FOREIGN PATENTS

| Number | Country | Date |
|---|---|---|
| 27,762 | Great Britain | of 1912 |

OTHER REFERENCES

"The Iron Age," March 2, 1944, page 46.
"Proceedings of the Blast Furnace and Raw Materials Committee," vol. 4 (1944), pages 53–58.